United States Patent
Yamaguchi et al.

(10) Patent No.: US 9,298,025 B2
(45) Date of Patent: Mar. 29, 2016

(54) ELECTRODE STRUCTURE FOR AN OPTICAL WAVEGUIDE SUBSTRATE

(71) Applicant: NGK INSULATORS, LTD., Aichi-prefecture (JP)

(72) Inventors: Shoichiro Yamaguchi, Ichinomiya (JP); Hiroshi Matsunaga, Nagoya (JP); Keiichiro Asai, Nagoya (JP)

(73) Assignee: NGK INSULATORS, LTD., Aichi-prefecture (JP)

( * ) Notice: Subject to any disclaimer, the term of this patent is extended or adjusted under 35 U.S.C. 154(b) by 0 days.

(21) Appl. No.: 14/499,424

(22) Filed: Sep. 29, 2014

(65) Prior Publication Data

US 2015/0098672 A1   Apr. 9, 2015

(30) Foreign Application Priority Data

Oct. 8, 2013 (JP) ................... 2013-210871

(51) Int. Cl.
*G02F 1/035* (2006.01)
*G02F 1/03* (2006.01)
*G02F 1/35* (2006.01)

(52) U.S. Cl.
CPC .............. *G02F 1/035* (2013.01); *G02F 1/0316* (2013.01)

(58) Field of Classification Search
CPC ................................. G02F 1/035; G02F 1/0316
See application file for complete search history.

(56) References Cited

U.S. PATENT DOCUMENTS

| | | | |
|---|---|---|---|
| 6,674,565 B2 | 1/2004 | Kondo et al. | |
| 6,810,181 B2* | 10/2004 | Yamaguchi et al. | 385/40 |
| 6,845,184 B1 | 1/2005 | Yoshimura et al. | |
| 7,068,863 B2* | 6/2006 | Kondo et al. | 385/2 |
| 7,536,066 B2 | 5/2009 | Kato et al. | |
| 7,558,307 B2* | 7/2009 | Kishimoto et al. | 372/46.01 |
| 7,809,218 B2 | 10/2010 | Iwata et al. | |
| 8,002,998 B2 | 8/2011 | Iwata et al. | |
| 8,394,499 B2* | 3/2013 | Jen et al. | 428/411.1 |
| 2004/0096161 A1* | 5/2004 | Yamaguchi et al. | 385/40 |
| 2009/0148717 A1* | 6/2009 | Jen et al. | 428/522 |
| 2015/0098672 A1* | 4/2015 | Yamaguchi et al. | 385/2 |

FOREIGN PATENT DOCUMENTS

| | | |
|---|---|---|
| JP | 2000-114581 A | 4/2000 |
| JP | 2002-040381 A | 2/2002 |
| JP | 2003-156723 A | 5/2003 |
| JP | 2008-052108 A | 3/2008 |
| JP | 2009-145816 A | 7/2009 |
| JP | 2011-085610 A | 4/2011 |
| WO | WO2007/013128 A1 | 2/2007 |

* cited by examiner

*Primary Examiner* — Rhonda Peace
(74) *Attorney, Agent, or Firm* — Cermak Nakajima & McGowan LLP; Tomoko Nakajima

(57) ABSTRACT

An optical part 20A includes a supporting body 1, an optical material substrate 2, an electrode provided on the supporting body 1, and a resin adhesive layer 4 adhering the electrode 7 and optical material substrate 2. The electrode 7 includes a chromium film 7c contacting the resin adhesive layer 4 and a gold film 7b provided between the chromium film 7c and supporting body 1.

6 Claims, 11 Drawing Sheets

ELECTRODE STRUCTURE FOR AN OPTICAL WAVEGUIDE SUBSTRATE

This application claims the benefits of Japanese Patent Application No. P2013-210871 filed on Oct. 8, 2013, the entirety of which is incorporated by reference.

FIELD OF THE INVENTION

The invention relates to an optical part of a type of adhering an optical material substrate on a supporting body.

BACKGROUND ARTS

As cloud computing develops, speed and frequency of an optical communication network are made higher, so that it is demanded improvement of optical modulation efficiency. As to an optical modulating device, for realizing matching of speeds of micro and light waves, it has been known to make a thickness of an optical waveguide substrate, composed of a non-linear optical material such as lithium niobate, very small and to adhere it to a separate supporting body. In this case, it is proposed that a conductive film is formed on the supporting body and the supporting body is adhered to the optical waveguide substrate through the conductive film, so as to prevent ripples in transmittance characteristics of micro wave due to the resonance of the supporting body (Patent Document 1; Japanese Patent Publication No. 2003-156723A). Such conductive film includes gold, silver and copper of a low resistance.

Generally, for lowering the wiring resistance, it has been used a gold (Au) electrode having a high electrical conductivity in many cases. In the case that an electrode is composed of a chrome film or the like, it is difficult to lower the resistance of the electrode to a necessary value so that designing of the electrode is difficult for attaining the necessary resistance value.

Further, according to a travelling wave-type optical modulator described in Patent Document 2 (Japanese Patent Publication No. 2002-040381A), it is proposed that an underlying film made of chrome film is formed on a lithium niobate body and gold plating is provided thereon to provide modulating electrodes modulating light propagating in an optical waveguide.

Patent Document 1

Japanese Patent Publication No. 2003-156723A

Patent Document 2

Japanese Patent Publication No. 2002-040381A

SUMMARY OF THE INVENTION

However, in the case that the gold film is formed on the supporting body and adhered to the thin optical waveguide substrate with a resin, it may be peeled off after tape strength test. Such device cannot be used for a long time period and its reliability is reduced to result in a cause of reduction of the yield. The cause of such phenomenon has not been known.

An object of the present invention is, in an optical part having the structure of adhering an optical material substrate to an electrode on a supporting body through a resin adhesive layer, to maintain a low resistance of the electrode and to prevent the peeling of the optical material substrate from the supporting body.

The present invention provides an optical part comprising:
a supporting body;
an optical material substrate;
an electrode provided on the supporting body; and
a resin adhesive layer adhering the electrode and the optical material substrate;
wherein the electrode comprises a chromium film contacting the resin adhesive layer and a gold film provided between the chromium film and supporting body.

The inventors studied that cause of the peeling of the optical material substrate from the supporting body in the case that the gold film is formed on the supporting body and the optical material substrate is adhered thereon through the resin adhesive layer. As a result, it was found that there was a problem on the surface of the gold film before the adhesion to the resin to result in the peeling after the adhesion.

That is, after the electrode is formed on the supporting body, it is necessary to clean the electrode surface to remove contaminants adhered onto the electrode surface. For this, conventionally, ultrasonic cleaning of organic series as well as scrub cleaning are effective for removing the sticking contaminants. In the case that the chromium metal film is provided on the surface of the supporting body, scrub cleaning is effective, so that it is possible to perform the adhesion without substantially generating bubbles if the warping of the supporting body is small.

However, in the case that the gold film is exposed to the surface of the supporting body and scrub cleaning is performed, for example, traces are left on the surface of the gold film due to the scrub and micro bubbles are generated around the traces. The optical material substrate is thereby peeled even when it is adhered with a resin. It was thus tried to adhere the gold film on the surface of the supporting body through the resin adhesive after the ultrasonic cleaning only without performing the scrub cleaning. However, it was thus proved that the contaminants adhered onto the surface of the gold film was not completely removed and the bubbles were generated around regions near the adhered contaminants. Further, in the case that the adhered optical material substrate is thinned, the peeling of the thinned substrate was started at the bubble generated regions and in a peripheral part of the optical material substrate. When tape peeling test was performed at the peeled parts in the peripheral part of the substrate, the peeling was developed along the interface of the surface of the gold film and resin adhesive.

Based on the findings, the inventors reached the idea of solving the problems described above, by further forming the chromium film on the gold film and by adhering the chromium film to the optical material substrate with the resin. That is, the conductivity necessary as the electrode is obtained by the gold film having a low resistance value and the chromium film is further formed on the surface of the gold film, so that it is possible to prevent the peeling of the optical material substrate from the supporting body, after the adhesion with the resin and especially during the thinning of the optical material substrate.

MODES FOR CARRYING OUT THE INVENTION

Figure 1:
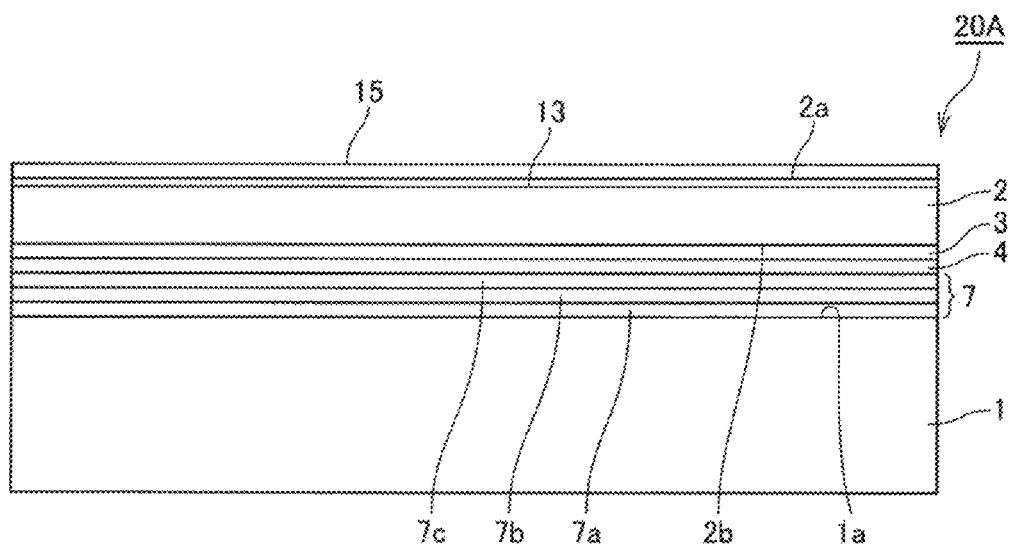
FIG. 1 is a view schematic showing an optical part 20A according to an embodiment of the present invention.

The present invention will be described below referring to the drawings.

Figure 3A:
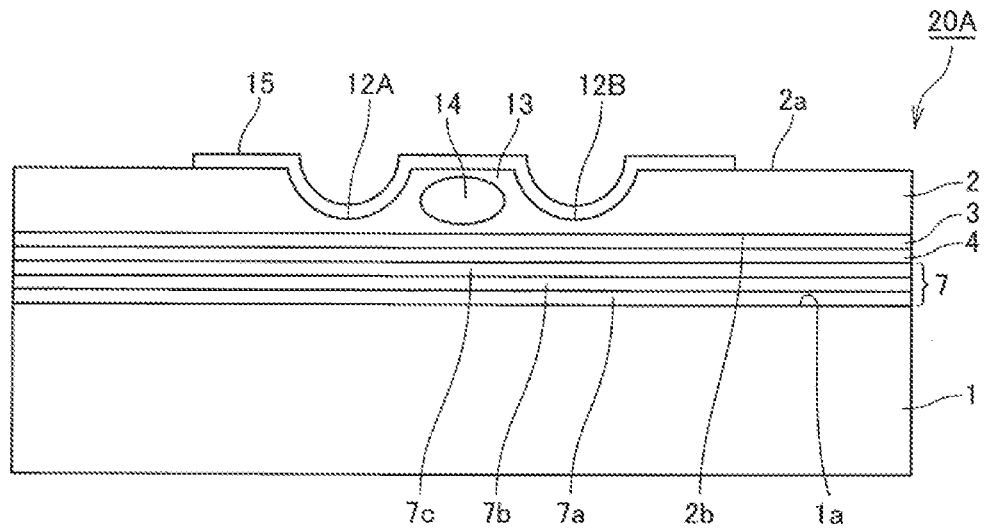
FIG. 3(a) is a view schematically showing a cross section of the optical part 20A.
Figure 4:
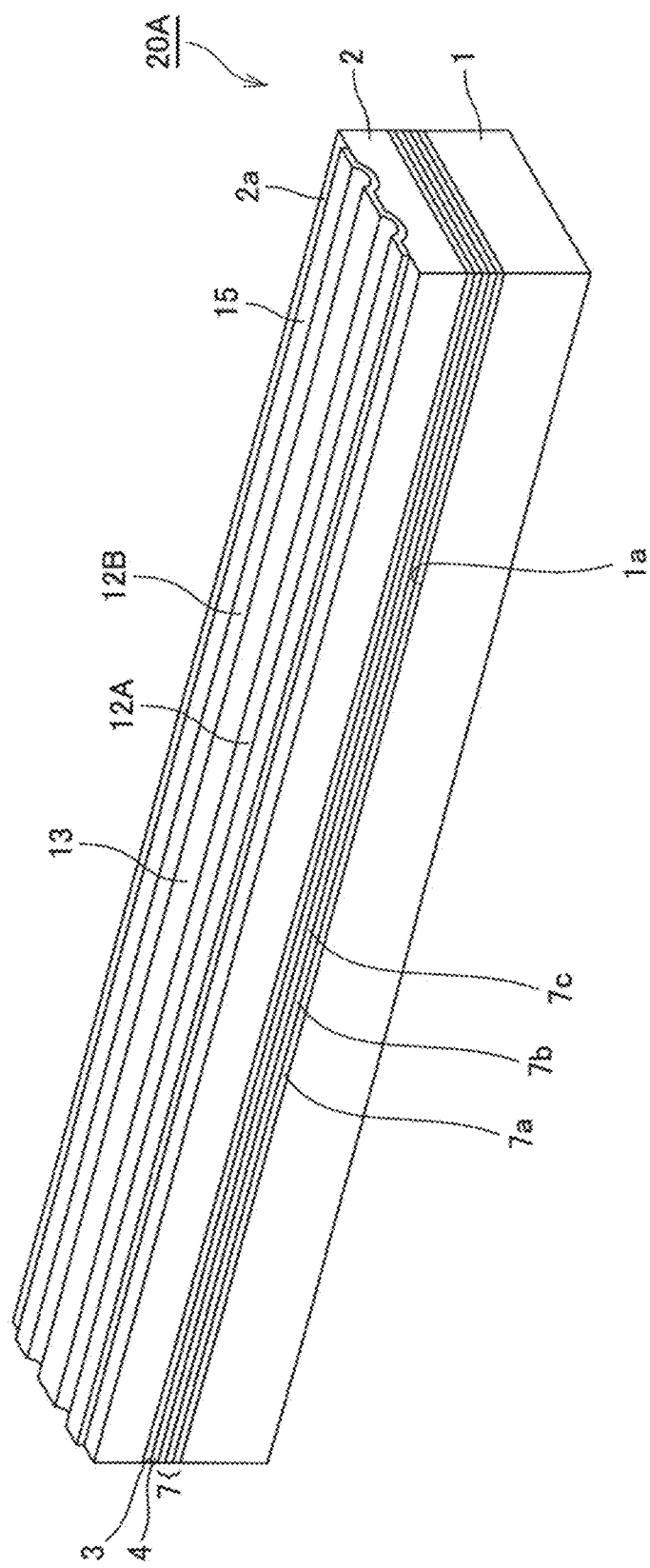
FIG. 4 is a perspective view schematically showing the optical part 20A.

FIGS. 1, 3(a) and 4 relate to an optical part 20A according to an embodiment of the present invention.

According to the present example, a main face 2b of an optical material substrate 2 is joined to a surface 1a of a supporting body 1 through an electrode 7, a resin adhesive layer 4 and buffer layer 3. According to the present example, an upper electrode 15 is formed on a main face 2a of the optical material substrate 2 in the opposite side of the supporting body 1. Further, according to the present example, a channel type optical waveguide 13 is formed in the optical material substrate 2.

According to the present example, the electrode 7 has three-layered structure. That is, a metal under layer 7a is provided on a supporting body 1, a gold film 7b is provided on the metal under layer 7a, and a chromium film 7c is formed on the gold layer 7b. The chromium film 7c directly contacts a resin adhesive layer 4.

According to the present example, the gold film 7b having a low resistance value provides conductivity necessary as an electrode 7, and the chromium film 7c is further formed on the gold film 7b to prevent the peeling of the optical material substrate 2 from the supporting body 1, after the adhesion with a resin and especially during the thinning process of the optical material substrate.

Figure 2:
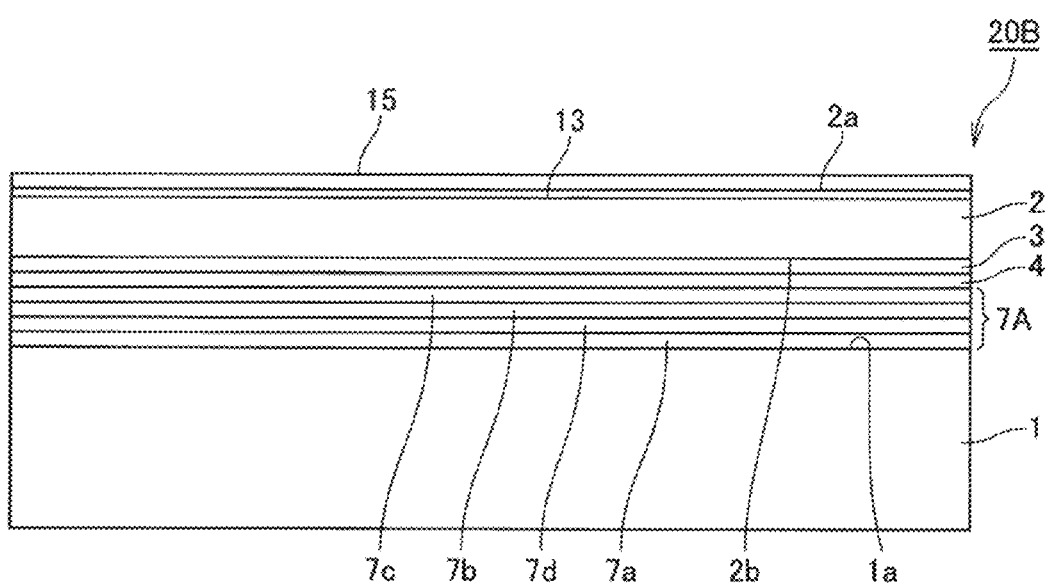
FIG. 2 is a view schematically showing an optical part 20B according to another embodiment of the present invention.
Figure 3B:
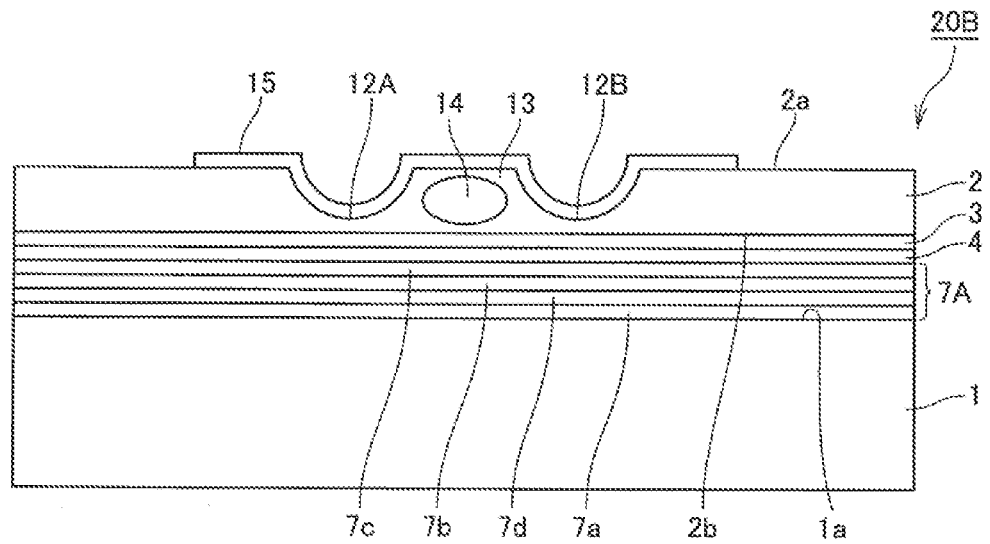
FIG. 3(b) is a view schematically showing a cross section of the optical part 20B.
Figure 5:
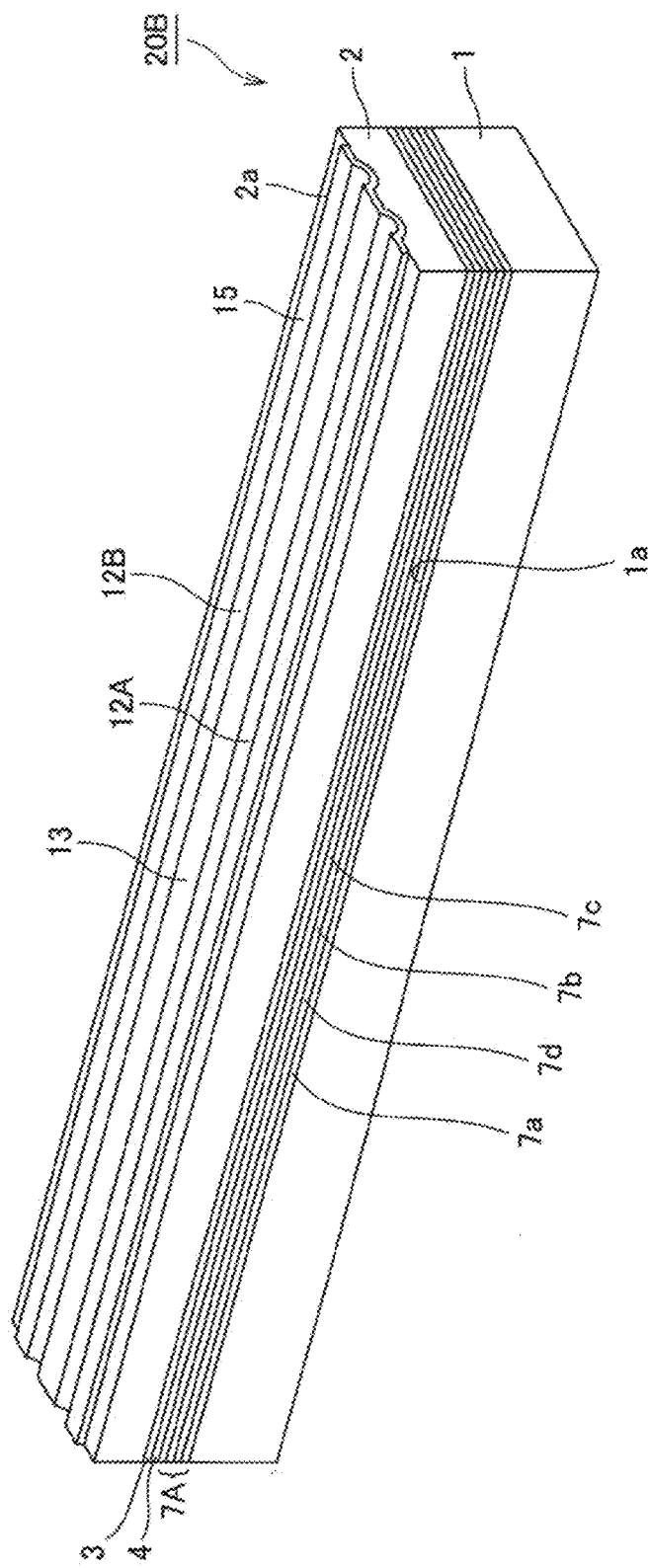
FIG. 5 is a perspective view schematically showing the optical part 20B.

FIGS. 2, 3(b) and 5 show an optical part 20B according to another embodiment of the present invention.

According to the present example, the main face 2b of the optical material substrate 2 is joined to the surface 1a of the supporting body 1 through the electrode 7A, resin adhesive layer 4 and buffer layer 3. According to the present example, the upper electrode 15 is formed on the main face 2a of the optical material substrate 2 on the opposite side of the supporting body 1. The channel type optical waveguide 13 is formed in the optical material substrate 2.

According to the present example, the electrode 7A has four-layered structure. That is, the metal under layer 7a is provided on the supporting body 1, an intermediate layer 7d is provided on the metal under layer 7a, the gold film 7b is provided on the metal intermediate layer 7d, and the chromium metal film 7c is provided on the intermediate layer 7d. The chromium film 7c directly contacts the resin adhesive layer 4.

According to the present example, the gold metal film 7b having a low resistance value provides conductivity necessary as the electrode, and the chromium film 7c is further formed on the gold film 7b to prevent the peeling of the optical material substrate 2 from the supporting body 1, after the adhesion with the resin and especially during the thinning process of the optical material substrate.

Figure 6:
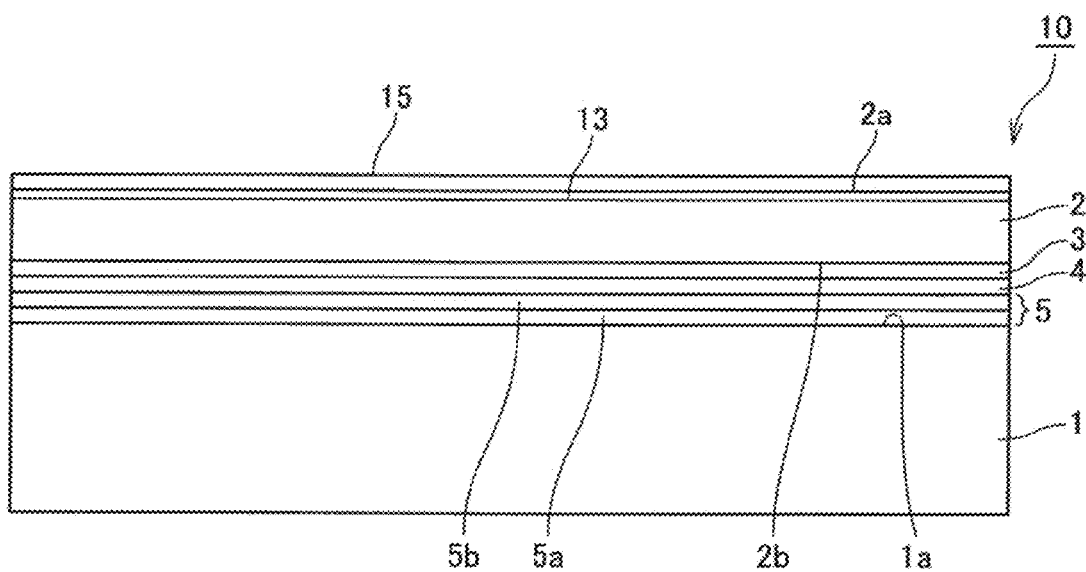
FIG. 6 is a view schematically showing an optical part 10 according to a comparative example.

FIG. 6 shows an optical part 10 according to a comparative example.

According to the example, the main face 2b of the optical material substrate 2 is joined to the surface 1a of the supporting body 1 through the electrode 5, resin adhesive layer 4 and buffer layer 3. The upper electrode 15 is formed on the main face 2a of the optical material substrate 2 on the opposite side of the supporting body 1. The channel type optical waveguide 13 is formed in the optical material substrate 2.

According to the example, the electrode 5 has two-layered structure. That is, the metal under layer 5a is provided on the supporting body 1, and the gold film 5b is provided on the metal under layer 5a. The gold film 5b directly contacts the resin adhesive layer 4.

According to the present example, as the gold film 5b is formed, it is possible to lower the resistance value of the electrode 5. However, the adhesion of the gold film 5b and resin adhesive layer 4 is not stable and the bubbles are left after the cleaning of the surface of the gold film 5b, providing starting points of development of peeling during the thinning step or the like of the optical material substrate.

Figure 7:
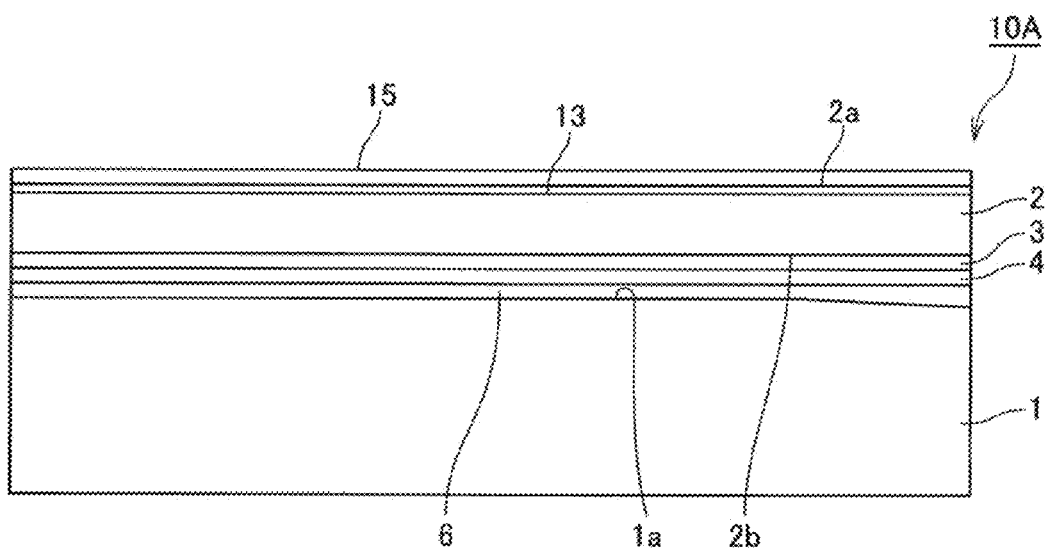
FIG. 7 is a view schematically showing an optical part 10A according to a comparative example.

FIG. 7 shows an optical part 10A according to another comparative example.

According to the present example, the main face 2b of the optical material substrate 2 is joined to the surface 1a of the supporting body 1 through the electrode 6, resin adhesive layer 4 and buffer layer 3. The upper electrode 15 is formed on the main face 2a of the optical material substrate 2 on the opposite side of the supporting body 1. The channel type optical waveguide 13 is formed in the optical material substrate 2.

According to the present example, the electrode 6 has single layered structure and composed of the chromium layer. The electrode directly contacts the resin adhesive layer 4. According to the present embodiment, it is difficult to lower the resistance value of the electrode 6 to a necessary degree. It is required to make the thickness of the electrode 6 sufficiently large for adequately lowering the resistance value of the electrode 6. However, as the thickness of the electrode 6 is made larger, the supporting body 1 is warped so that the bubbles may be left on the surface of the electrode to result in the peeling of the adhesive body.

Each of the components of the present invention will be further described below.

The kind of the optical part is not particularly limited, as far as it is capable of performing optical function. Specifically, it includes a wavelength converting device, an optical modulating device, an optical switching device or the like. The optical modulating device is not particularly limited, as far as the property of light is modulated, and may be an optical intensity modulator or optical phase modulator. The optical intensity modulator may be an optical magnitude modulator utilizing a Mach-Zehnder type optical waveguide. The optical phase modulator means that of applying phase modulation on incident light and of obtaining phase-modulated signal from emitting light. Further, a periodic domain inversion structure may be formed in the optical material substrate.

The material of the supporting body includes lithium niobate, lithium tantalate, lithium niobate-lithium tantalate solid solution, potassium lithium niobate, a glass such as quartz glass, Si or the like.

An optical material forming the optical material substrate is not particularly limited, and includes lithium niobate, lithium tantalate, lithium niobate-lithium tantalate solid solution, potassium lithium niobate, KTP, GaAs, quartz, $K_3Li_2Nb_5O_{15}$, $La_3Ga_5SiO_{14}$ or the like. Further, the optical material may be of congruent composition or stoichiometric composition.

In order to further enhance the optical damage resistance of the optical waveguide, the optical material may contain one or more metallic elements selected from the group consisting of magnesium (Mg), zinc (Zn), scandium (Sc) and indium (In), and magnesium is especially preferable. Further a rare earth element may be contained as a dopant into the optical material. The rare earth element functions as an additive element for laser oscillation. As the rare earth element, Nd, Er, Tm, Ho, Dy and Pr are especially preferable.

According to a preferred embodiment, the optical material substrate includes a pair of opposing main faces, a pair of opposing side faces and optically polished end faces, The main faces mean surfaces having areas larger than those of the remaining faces.

Although the thickness of the optical material substrate is not particularly limited, on the viewpoint of improving the confinement of optical energy in the substrate and the modulation efficiency, for example, in the case of an optical modulator, the thickness of the substrate may preferably be 10 μm or smaller and more preferably be 5 μm or smaller. Further, on the viewpoint of handling of the substrate, the thickness of the optical material substrate may preferably be 0.5 μm or larger. The peeling starting from the interface between the resin adhesive layer and electrode as described above tends to occur during the thinning process of the optical material substrate, so that the present invention is particularly effective in the case that the optical material substrate is thin.

The kind of the optical waveguide formed in the optical material substrate is not particularly limited, and includes a slab type and channel type optical waveguides. Further, the kind of the waveguide may be an inner-diffusion type optical waveguide such as titanium diffusion waveguide or a ridge type optical waveguide.

For example, according to optical parts of examples shown in FIGS. 3(a) and 3(b), a pair of ridge grooves 12A, 12B are formed on the side of the main face 2a of the optical material substrate 2 to form a ridge type optical waveguide 13. 14 represents optical beam.

A method of forming the ridge grooves 12A and 12B in the optical material substrate is not limited, and includes mechanical processing, ion milling, dry etching, laser ablation or the like.

According to a preferred embodiment, an upper electrode is provided on the main face of the optical device on the opposite side of the supporting body. For example, according to the optical parts of the respective examples shown in FIGS. 3(a) and 3(b), the upper electrode 15 is provided on the upper main face 2a of the optical material substrate 2, and a modulating voltage is applied between the upper electrode 15 and the lower electrode 7 or 7A.

The resin adhesive layer for adhering the optical material substrate and supporting body may be made of epoxy resin adhesive, a thermosetting type resin adhesive or an ultraviolet light curable type adhesive.

Although the difference between the refractive index of the resin adhesive layer and the refractive index of the optical material substrate depends on the thickness and refractive index of the buffer layer, it may prefer be 10 percent or larger and more preferably be 20 percent or larger of that of the resin adhesive layer on the viewpoint of confinement of light. Further, the thickness of the resin adhesive layer may preferably be 0.2 μm or larger on the viewpoint of stable adhesion and may preferably be 2 μm or smaller on the viewpoint of reducing deviation of substrate thickness after the thinning of the substrate by polishing.

The electrode provided on the supporting body includes the chromium film directly contacting the resin adhesive layer and the gold film provided between the chromium film and supporting body.

The thickness of the gold film may preferably be 0.03 μm or larger and more preferably be 0.05 μm or larger, on the viewpoint of improving the conductivity. Further, although the thickness of the gold film is not particularly limited, it is an expensive material, so that the thickness of the gold film may preferably be 0.2 μm or smaller and more preferably be 0.1 μm or smaller on the viewpoint of cost.

The thickness of the chromium film directly contacting the resin adhesive layer may preferably be 0.03 μm or larger and more preferably be 0.05 μm or larger on the viewpoint of the present invention. Further, the thickness of the chromium film may preferably be 0.1 μm or smaller and more preferably be 0.08 μm or smaller, on the viewpoint, of preventing the warping of the optical part.

According to a preferred embodiment, a metal under layer is provided between the chromium film and supporting body. For example, according to embodiments shown in FIGS. 1 to 5, the metal under layer 7a is provided between the gold film 7b and the surface 1a of the supporting body 1. It is thus possible to further improve the adhesion of the gold film onto the supporting body. The material of such metal under layer may preferably be nickel, titanium, tantalum or molybdenum and most preferably be chromium.

An intermediate layer may be further provided between the gold film and metal under layer. The material of such intermediate layer may preferably be nickel, titanium or platinum.

Although the method of producing the respective films forming the electrode is not particularly limited, it includes sputtering and vapor deposition.

Further, a buffer layer may be formed on the upper and lower main faces, respectively, of the optical material substrate. For example, according to the examples shown in FIGS. 1 to 5, the buffer layer 3 is formed on the lower main face 2b of the optical material substrate 2. By the buffer layer, it is possible to reduce absorption loss of light due to each of the electrodes, to improve the confinement of light within the optical material substrate, and to realize an optical waveguide having spot pattern with excellent symmetry as conventional optical fibers.

Therefore, a difference between the refractive index of the optical material substrate and that of the buffer layer may preferably be 10 percent or larger, and more preferably be 20 percent or larger, of the refractive index of the buffer layer. Further, the thickness of the buffer layer may preferably be 0.1 μm or larger on the viewpoint of confinement of light and may preferably be 1 μm or smaller on the viewpoint of increase of a half wavelength voltage.

The material of the buffer layer may preferably be $SiO_2$ or $Ta_2O_5$.

In the thinning process of the optical material substrate, lapping or polishing may be performed after grinding. Further, after the polishing of the surface of the supporting body, cleaning process may be performed as follows.

That is, the supporting body is subjected to cleaning with a scrub and an organic solvent and then subjected to ultrasonic cleaning with an organic solvent, ultrasonic cleaning with pure water and flow cleaning with pure water.

EXAMPLES

Inventive Example 1

It was produced the optical part 20A having the shape shown in FIGS. 1, 3(a) and 4.

Specifically, on an upper face of a z-plate of a lithium niobate single crystal doped with 5 mol % of MgO and having a thickness of 500 µm, the buffer layer 3 made of $SiO_2$ and having a thickness of 0.5 µm was formed by sputtering method.

Further, the supporting body 1 was made of a z-plate of non-doped lithium niobate single crystal substrate having a thickness of 1 mm. On the upper face 1a of the supporting body 1, it was formed the chromium film 7a with a thickness of 0.05 µm, gold film 7b with a thickness of 0.1 µm and chromium film 7c with a thickness of 0.05 µm by sputtering method. Then, the surface of the electrode was subjected to scrub cleaning with an organic solvent, then ultrasonic cleaning with an organic solvent, ultrasonic cleaning with pure water and flow cleaning with pure water.

Then, the z-plate of the lithium niobate single crystal substrate doped with 5 mol % MgO was adhered onto the supporting body 1 by a resin adhesive with the buffer layer 3 orientated downwardly. Here, in the MgO-doped lithium niobate substrate, it may be formed a hole having a diameter of about 100 µm or a groove having a width of 100 µm in a part of the substrate for drawing the lower electrode 7 described below. As to the processing of the hole, for example laser processing may be applied, and as to the processing of the groove, it may be utilized a method of cutting the substrate to the intermediate part by dicing. The upper main face of the MgO-doped lithium niobate substrate was processed to a thickness of 3.7 µm by grinding and polishing. By the grinding and polishing, the part with the processed hole or with the processed groove was removed so that the resin adhesive layer 4 covering the lower electrode 7 is exposed through the groove or hole. The exposed resin adhesive layer 4 can be removed by ashing, so that the lower electrode 7 for drawing electrode can be exposed to the surface. Thereafter, the MgO-doped lithium niobate substrate was processed by excimer laser to form the grooves 12A and 12B each having a depth of 2.2 µm and the ridge type-optical waveguide 13 having a width of 5.3 µm. The buffer layer made of $SiO_2$ and having a thickness of 0.5 µm was formed and the upper electrode 15 was then formed thereon. The upper electrode 15 has the three-layered structure of chromium, nickel and gold films.

Then, it was cut with a dicing saw into chips each having a width of 3 mm and a length of 13 mm, and the end faces of the chip were subjected to optical polishing to a length of 12 mm. The thus obtained phase modulation device was optically connected to an SI (step index) fiber having a core size of 6 µm through an ultraviolet curable resin. Finally, the electrode parts on the respective side faces were subjected to wire bonding for assuring connection with an outer circuit. Further, the length of the lower electrode in the longitudinal direction of the device was made 10 mm.

As laser light having a wavelength of 1064 nm was irradiated into the thus obtained phase modulator, the optical loss was proved to be 0.5 dB/cm and good propagation property could be obtained. Further, the half-wavelength voltage was evaluated and proved to be about 7V.

Figure 8:
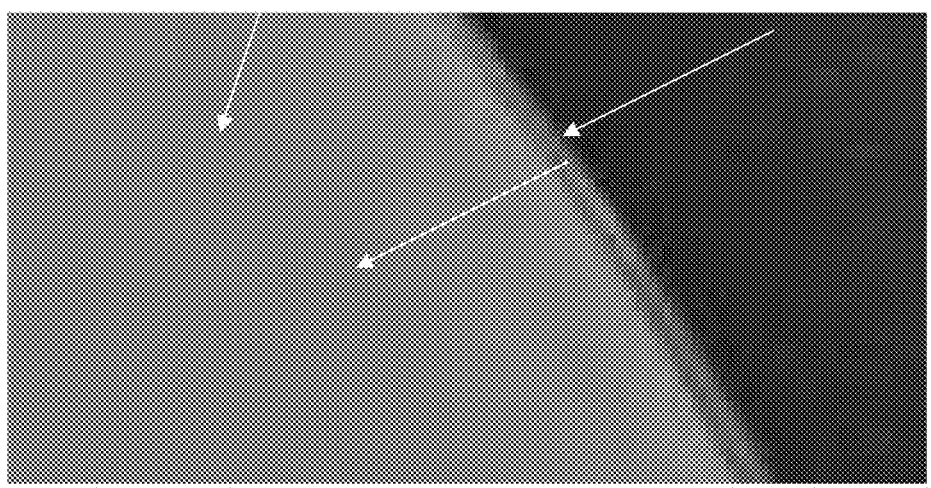
FIG. 8 is a photograph showing the state of adhesion according to the inventive example.

According the present example, after the optical material substrate was subjected to thinning process, tape test was performed at the ends of the sample, and the thus observed photograph was shown in FIG. 8. In FIG. 8, an arrow on the upper left side shows the optical material substrate, and an arrow on the upper right side shows the resin adhesive layer and electrode. According to the results of the tape test, the peeling of the optical material substrate after the thinning was not developed and the adhesion was maintained. That is, after the optical material substrate was subjected to the thinning process, the peeling of the optical material substrate was not observed at all and the state of the adhesion was proved to be stable.

Comparative Example 1

It was produced the optical part 10A having the shape shown in FIG. 7, according to the same procedure as the Example 1. However, different from the Inventive Example 1, the electrode 7 composed of the three layers was not provided, and instead the electrode 6 composed of a single layer of the chromium film was formed by sputtering method.

However, as the resistance of chromium is higher than that of gold, it was needed to make the film thickness of the electrode 0.5 µm or larger for obtaining a sheet resistance comparable with that obtained in the Inventive example 1. As a result, the adhered body was warped by more than 100 µm, and although a part of the adhered body could be joined, it was impossible to make an area of the void (bubble) generated region small.

Comparative Example 2

It was produced the optical part 10A having the shape shown in FIG. 7, according to the same procedure as the Inventive Example 1. However, different from the Inventive Example 1, it was not provided the electrode 7 composed of the three layers, and instead the electrode 6 composed of a single layer of the chromium film was formed by sputtering method.

However, different from the comparative example 1, the film thickness of the chromium film was lowered to 0.2 µm to perform the adhesion with resin, although the resistance becomes higher. However, the warping of the substrate of about 30 µm was observed so that it could not be reduced an amount of bubbles during the adhesion.

Comparative Example 3

The resistance and the warping were proved to be large in the case that the electrode was composed of the chromium film only. It was thus produced the optical part 10 having the shape shown in FIG. 6, according to the same procedure as the Inventive Example 1. However, different from the Inventive Example 1, it was not provided the electrode 7 composed of the three layers, and instead, it was provided the electrode 5 composed of the under layer 5a of a chromium film and the gold film 5b by sputtering method. The film thickness of the chromium film 5a was made 0.05 µm and the film thickness of the gold film 5b was made 0.1 µm.

However, as the scrub cleaning is performed, traces due to the scrub were left on the surface of the gold film and micro bubbles were generated around the traces. As the thus obtained adhered body was subjected to the thinning process, the thinned substrate started to be peeled off at the bubble parts as well as at the peripheral part of the substrate. As the tape peeling test was performed at the peeled parts in the peripheral part of the substrate, the peeling was developed along the interface between the surface of the gold film and resin adhesive. As to this situation, the subsequent steps of producing devices were not performed.

Comparative Example 4

It was produced the optical part 10 having the shape shown in FIG. 6, according to the same procedure as the Inventive Example 1. However, different from the Inventive Example 1, it was not provided the electrode 7 composed of the three layers, and instead, the electrode 5 composed of the under layer 5a of the chromium film and gold film 5b was formed by sputtering method. The film thickness of the chromium film 5a was made 0.05 μm and the film thickness of the gold film 5b was made 0.1 μm.

Figure 9:
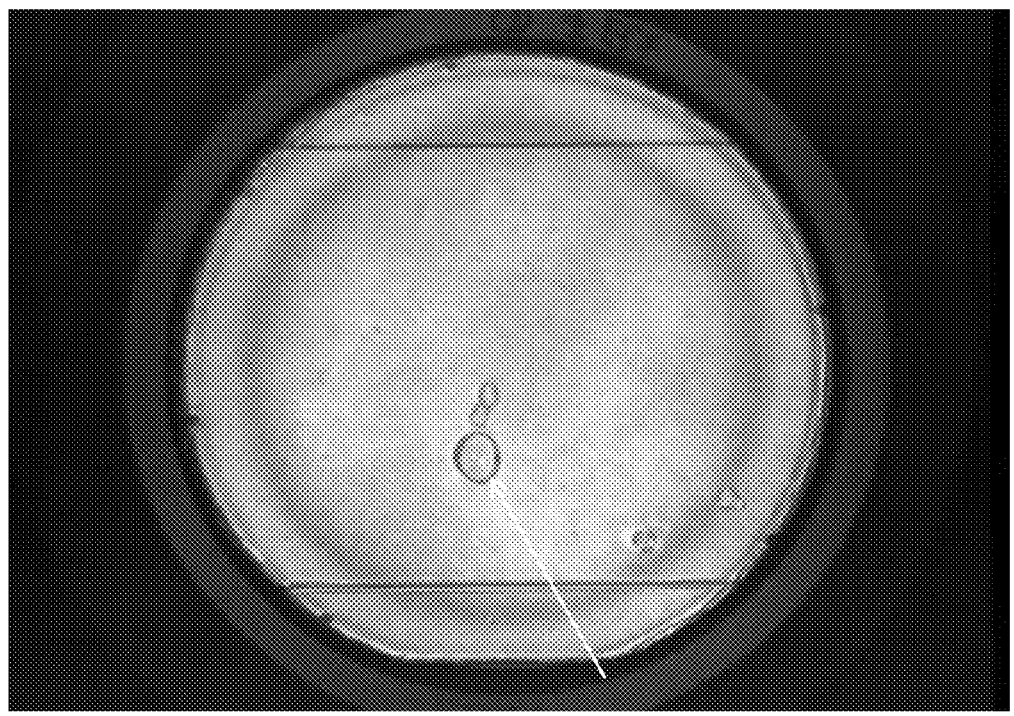
FIG. 9 is a photograph showing bubbles on a surface of a gold film after ultrasonic cleaning according to a comparative example.

Then, after the gold film was subjected to ultrasonic cleaning, the scrub cleaning was omitted. Here, as the surface of the electrode after the ultrasonic cleaning was observed, it was proved that, as shown in FIG. 9, contaminants adhered onto the electrode surface could not be fully removed and bubbles were generated as an arrow in the region where the contaminants were left.

Figure 10:
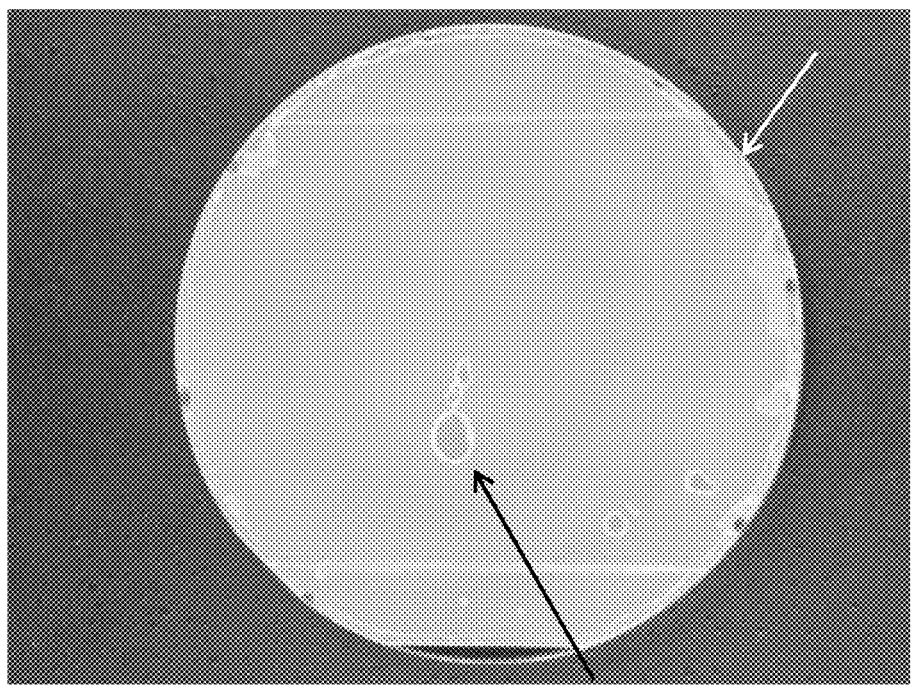
FIG. 10 is a photograph showing the state that the peeling takes place at the bubble generated regions and peripheral part of an adhered body according to the comparative example.
Figure 11:
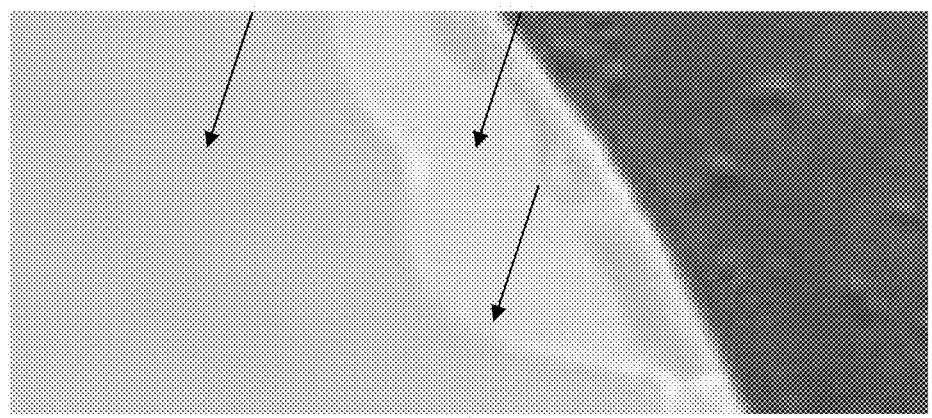
FIG. 11 is a photograph showing an enlarged view of the peripheral part of the adhered body of FIG. 10.

Then, after the electrode was adhered onto the optical material substrate, the optical material substrate was subjected to thinning process. As a result, as shown by an arrow in the lower side of FIG. 10, the peeling took place in the regions with the bubbles generated and the peeling further took place from the peripheral part of the substrate as shown by an arrow in the upper right side. FIG. 11 is an enlarged view showing the peeled region in the upper right peripheral part in FIG. 10. Here, in FIG. 11, the upper left arrow points the optical material substrate, the upper right arrow points the gold film and the lower right arrow points the developing peeling parts.

As the tape peeling test was performed at the peeled parts in the peripheral part of the substrate, the peeling was developed along the interface between the surface of the gold film and resin adhesive. As to this situation, the subsequent steps of producing devices were not performed.

The invention claimed is:
1. An optical part comprising:
   a supporting body;
      an optical material substrate;
      an electrode provided between said supporting body and said optical material substrate; and
      a resin adhesive layer adhering said electrode and said optical material substrate,
      wherein said electrode comprises
         a chromium film contacting said resin adhesive layer and a gold film provided between said chromium film and said supporting body, and
         a metal under layer provided between said gold film and said supporting body.
2. The optical part of claim 1, wherein said metal under layer comprises chromium.
3. The optical part of claim 1, wherein said electrode further comprises an intermediate layer provided between said gold film and said metal under layer.
4. The optical part of claim 1, further comprising an optical waveguide formed in said optical material substrate.
5. The optical part of claim 1, comprising an optical modulating part.
6. The optical part of claim 1, further comprising a periodic domain inversion structure formed in said optical material substrate.

\* \* \* \* \*